(12) United States Patent
Jones

(10) Patent No.: US 8,033,161 B2
(45) Date of Patent: Oct. 11, 2011

(54) ANTENNA LEAK DETECTION DEVICE AND METHOD

(75) Inventor: Thaddeus M. Jones, Bremen, IN (US)

(73) Assignee: MSX, Incorporated, South Bend, IN (US)

( * ) Notice: Subject to any disclaimer, the term of this patent is extended or adjusted under 35 U.S.C. 154(b) by 496 days.

(21) Appl. No.: 12/165,790

(22) Filed: Jul. 1, 2008

(65) Prior Publication Data

US 2010/0000297 A1 Jan. 7, 2010

(51) Int. Cl.
*G01M 3/26* (2006.01)
(52) U.S. Cl. ............. 73/40; 73/40.5 R; 73/46; 73/49.8
(58) Field of Classification Search ............. 73/40–49.8
See application file for complete search history.

(56) References Cited

U.S. PATENT DOCUMENTS

| 5,866,802 | A  | * | 2/1999  | Kimata et al. ............. 73/40.5 R |
| 5,898,105 | A  | * | 4/1999  | Owens ........................ 73/49.8 |
| 6,795,753 | B2 | * | 9/2004  | Vanderhoof et al. ......... 700/301 |
| 7,107,820 | B2 | * | 9/2006  | Nunnally et al. ................. 73/40 |
| 7,441,441 | B2 | * | 10/2008 | Omer ........................ 73/40.5 R |

\* cited by examiner

*Primary Examiner* — David A. Rogers
(74) *Attorney, Agent, or Firm* — Taylor IP, P.C.

(57) ABSTRACT

An apparatus for determining the integrity of an antenna system, including a controller, at least one valve operationally connected to the controller, a source of pressurized gas, at least one microwave antenna and a pressure sensor. The at least one microwave antenna is fluidly connected to the pressurized gas by way of the at least one valve. The pressure sensor is in communication with the controller. The pressure sensor senses the pressure of the pressurized gas. The controller is configured to check for a gas leak in the at least one microwave antenna by checking for a change in the pressure with the at least one valve being alternatively opened and closed.

11 Claims, 3 Drawing Sheets

ANTENNA LEAK DETECTION DEVICE AND METHOD

BACKGROUND OF THE INVENTION

1. Field of the Invention

The present invention relates to an antenna system, and, more particularly, to an air leak detection device for an antenna system.

2. Description of the Related Art

Typical microwave antenna systems include a transmission line, a feed horn and a reflector dish. There are many types of configurations of these components depending upon the antenna type and frequency range. The transmission line conducts radio frequency signals to and from the feed horn. The feed horn operation is critical to the proper operation of the entire antenna system. The fundamental purpose of the feed horn is to match the impedance of the transmission, which may typically be 50 ohms to that of free space, which is approximately 377 ohms. At typical microwave frequencies, such as in the C band and above, the transmission line is also commonly called a waveguide that is normally hollow. The feed horn itself, often called the feed, includes a conical structure that is hollow and is connected to the waveguide.

Often the feed horn is mounted so that it is offset from the center of the reflector. The reflector may be a section of a parabola and the offset feed scheme prevents the feed and the feed support from shading the reflector and thus reducing its effective aperture for other performance problems.

The offset feed scheme often requires the feed horn to be positioned such that rain, water or snow may enter therein. If water enters the feed horn it causes corrosion and signal loss. This problem is further exasperated by the flow of water into the radio frequency components used in the receiver/transmitter. Typically the opening in the feed horn is covered with a membrane, such as a plastic membrane to shield the system and to prevent the entry of water thereby. The plastic membrane must pass radio frequency energy with minimum attenuation. This imposes a limit on the material that can be used for constructing the membrane. Typical membranes are sensitive to sunlight and more particularly to the ultraviolet light that causes the membrane to become brittle and crack.

The radio frequency components are substantially hermetically sealed and while leakage often occurs through the membrane it is also understood that other portions of the feed horn, waveguide or radio frequency components can also allow ambient air to leak into the interior thereof. Leakage can be the result of leaking gaskets, fatigue cracks in the transmission line or other components as well. Ambient air contains gaseous water and when the ambient temperature falls to or below the dew point, condensation will occur within the system. Water that condenses therein is typically too viscous to escape and it remains trapped inside of the radio frequency components causing corrosion damage and it also modifies the impedance of the transmission line and feed horn. The most popular method of keeping the interior of the radio frequency components from the radio/transmitter all the way to the feed horn is to pressurize the system with low-pressure dry air. The pressurized dry air may slowly leak through the various openings in the antenna system but this prevents moist ambient air from leaking thereinto. Typical pressures range from 0.25 to 6 lbs per square inch above the ambient pressure. The supply of the dry air will typically have a dew point that is below −50° C.

The pressurized air may be supplied by way of a small compressor and an air-drying system. A typical installation may have four to eight or more antenna systems that utilize the pressurized dried air from the single supply source.

A leak in one of the antennas can compromise the ability of the rest of the antennas to be adequately protected since the compromise depletes the supply of dried pressurized air. A substantial leak in one antenna then can lead to the eventual failure or degradation of the rest of the antennas since they are all then starved for the necessary pressurized dry air.

What is needed in the art is a device and system that will detect and isolate a leak of air in an antenna system.

SUMMARY OF THE INVENTION

The present invention provides a microwave antenna leak detection system and method.

The invention in one form is directed to an apparatus for determining the integrity of an antenna system, including a controller, at least one valve operationally connected to the controller, a source of pressurized gas, at least one microwave antenna and a pressure sensor. The at least one microwave antenna is fluidly connected to the pressurized gas by way of the at least one valve. The pressure sensor is in communication with the controller. The pressure sensor senses the pressure of the pressurized gas. The controller is configured to check for a gas leak in the at least one microwave antenna by checking for a change in the pressure with the at least one valve being alternatively opened and closed.

An advantage of the present invention is that a multi antenna system having one or more air leaks can be protected by the isolation of the leaky systems.

Another advantage of the present invention is that the leak detection system communicates the problem to an operator so that maintenance can be scheduled and affected.

Yet another advantage of the present invention is that the pressurized gas and dehydrator systems are preserved by keeping the capacity of the gas and dehydrating systems from being over taxed.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
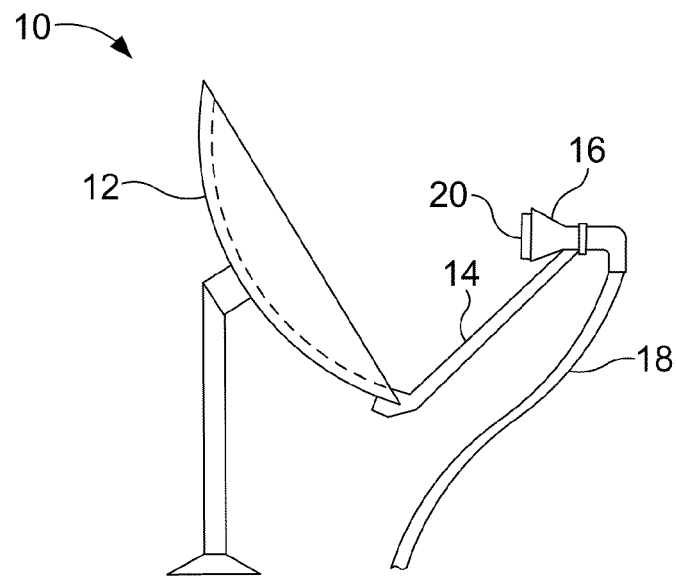
FIG. 1 illustrates a single antenna system utilizing an embodiment of the present invention and method.
Figure 2:
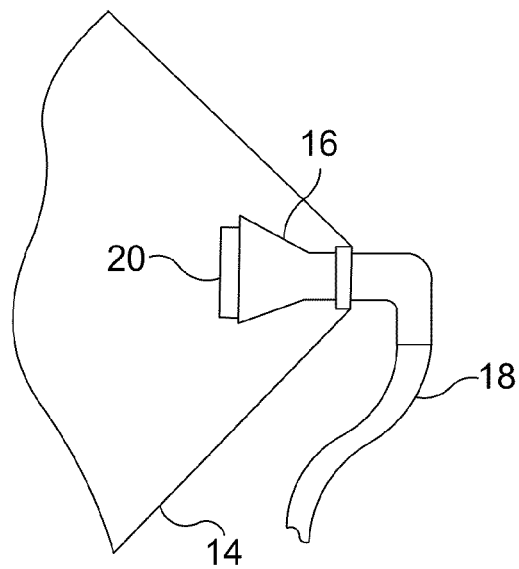
FIG. 2 is another view of a feed horn utilized in the antenna system of FIG. 1.

Referring now to the drawings, and more particularly to FIGS. 1 and 2, there is shown an antenna system 10 having a reflective dish 12, a support 14, a feed horn 16, a waveguide 18 and a membrane 20. Although antenna system 10 is illustrated as a single system in FIGS. 1 and 2 it is to be understood that a multitude of antennas are included in antenna system 10. Each antenna includes a reflective dish 12 with a feed horn 16 oriented to receive and transmit a signal reflected off of reflective dish 12. The shape of reflective dish 12 is chosen to focus the energy received to an entry port of feed horn 16 and in a like manner to reflect the signal issuing from feed horn 16. The positioning of reflective dish 12 directs the direction of the signal coming therefrom. Waveguide 18 is connected to feed horn 16 and directs the radio frequency energy to or from a receiver/transmitter, not shown. Whereas waveguide 18 as well as feed horn 16 is hollow, membrane 20 is positioned over the end of feed horn 16 in order to prevent or at least reduce the amount of ambient air that can enter into hollow portions of feed horn 16 and waveguide 18. As discussed above membrane 20 may be considered a weak link in the pressurized air that is supplied to feed horn 16 and 18 but the leakage of air from system 10 is not limited thereto.

Figure 3:
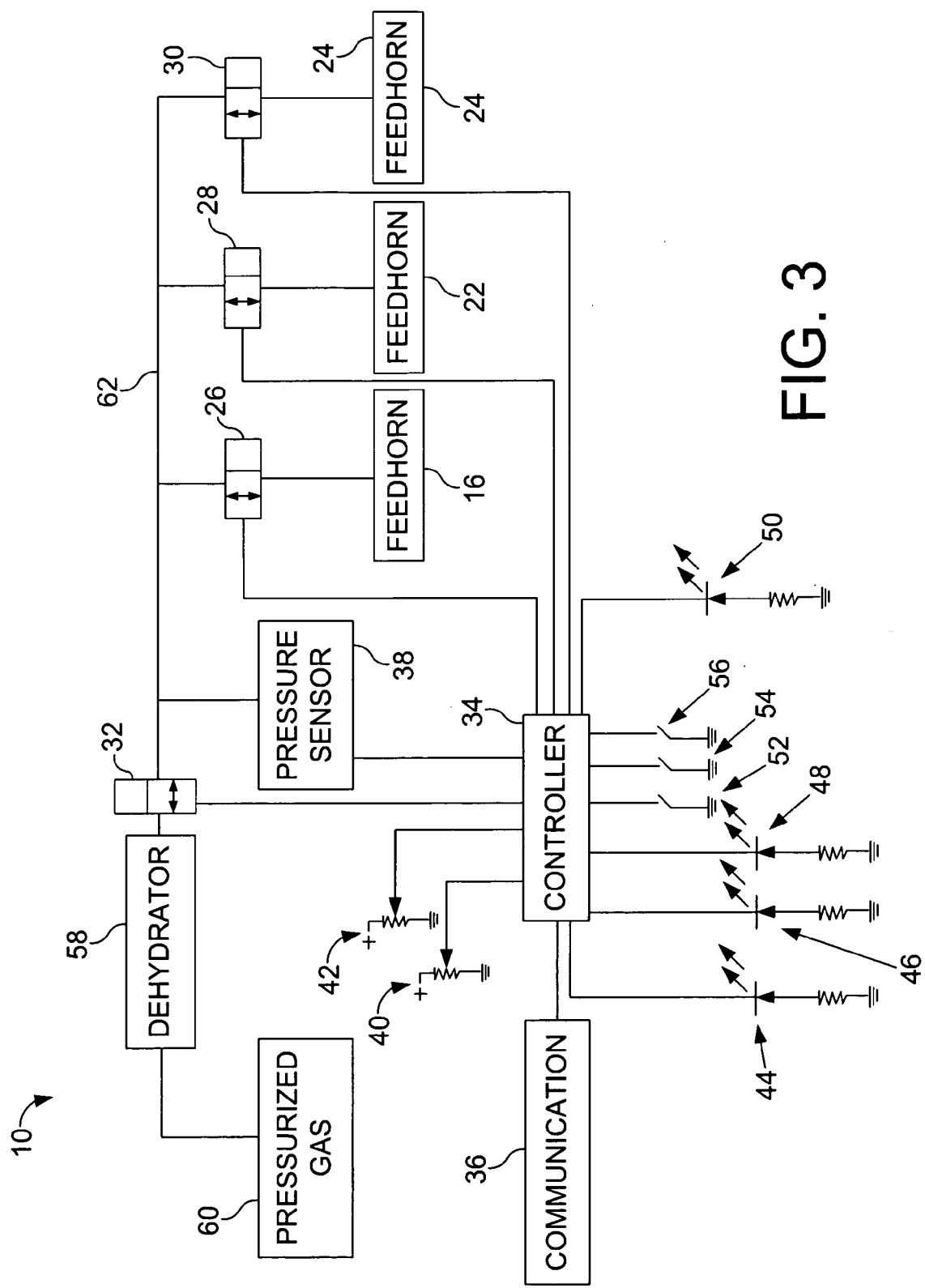
FIG. 3 is a schematized illustration of an embodiment of the present invention.

Now, additionally referring to FIG. 3, there is shown an embodiment of the present invention configured for dealing with three antenna systems represented by feed horns 16, 22 and 24. It is to be understood that any number of antenna systems can be utilized in this system by paralleling additional valves and antennas as illustrated in FIG. 3. Additionally, even though feed horns 16, 22 and 24 are shown it is to be understood that they each represent an entire antenna, waveguide and transmitter/receiver sections that are pressurized by the device and method of the present invention. Antenna system 10 includes feed horns 16, 22 and 24, valves 26, 28, 30 and 32, a controller 34, a communication device 36, a pressure sensor 38, a pressure level setting device 40, a time delay setting device 42, indicators 44, 46, 48 and 50, switches 52, 54 and 56, dehydrator 58 and a pressurized gas source 60. The electronic connections to feed horns 16, 22 and 24 are not separately illustrated and a line connected to each of feed horns 16, 22 and 24 are illustrative of the gas coupling thereto. Although referred to herein as a gas, the gas may simply be ambient air that is pressurized and subsequently dehydrated. Valves 26, 28, and 32 are all under the control of controller 34 and are electro-magnetically actuated. The valves are illustrated as having two positions although other types of valves are also contemplated. Further, line restrictions of a predetermined amount may be positioned in the lines following valve 32 or preceding valve 32. The restrictions would limit the gas flow therethrough to a predetermined amount. Valve 32 may be omitted, but is included to illustrate one manner in which the present invention can be carried out.

Communication device 36 is connected to controller 34 for the purpose of conveying problems detected by controller 34 to a user by way of telecommunications, Internet or other communication method. Pressure sensor 38 is fluidly coupled to the line that supplies gas to feed horn 16, 22 and 24. Line 62 can be understood to be a manifold 62. Pressure sensor 38 detects a pressure in line 62 and sends a signal to controller 34 representative thereof.

Pressure level setting device 40 allows the setup technician to select a particular pressure representative of a minimum pressure that would indicate failure of the system if the pressure is detected to be below that level. Although illustrated as a potentiometer, the value may also be digitally entered into controller 34. In a like manner time delay setting device 42 is illustrated as a potentiometer and provides that controller 34 may check the system after suitable time delay as set by time delay setting device 42.

Indicators 44, 46 and 48 are separately illuminated when a problem is detected in feed horns 16, 22 and 24, respectively. For example, if feed horn 16 is found to have developed a leak then indicator 44 is illuminated to indicate a problem to indicate a problem therewith. This allows for ease of troubleshooting and shows that a particular antenna has been isolated from pressurized gas system 60.

Switches 52, 54, 56 allow the setup technician to select which of the antenna systems are active. For example, if system 10 has the capability of detecting leaks in ten antenna systems and the particular installation utilizes six antenna systems then the operator, by selecting the switches indicates to controller 34, which of several valves, to leave in an off position and those particular valves are not connected to antennas.

As previously mentioned, pressurized gas source 60 may be a compressor or alternatively another source of pressurized gas such as pressurized gas contained in a cylinder. If the gas is already dehydrated then dehydrator 58 is not needed. In a normal installation the source of pressurized gas 60 is a compressor system with dehydrator 58 removing water therefrom.

Figure 4:
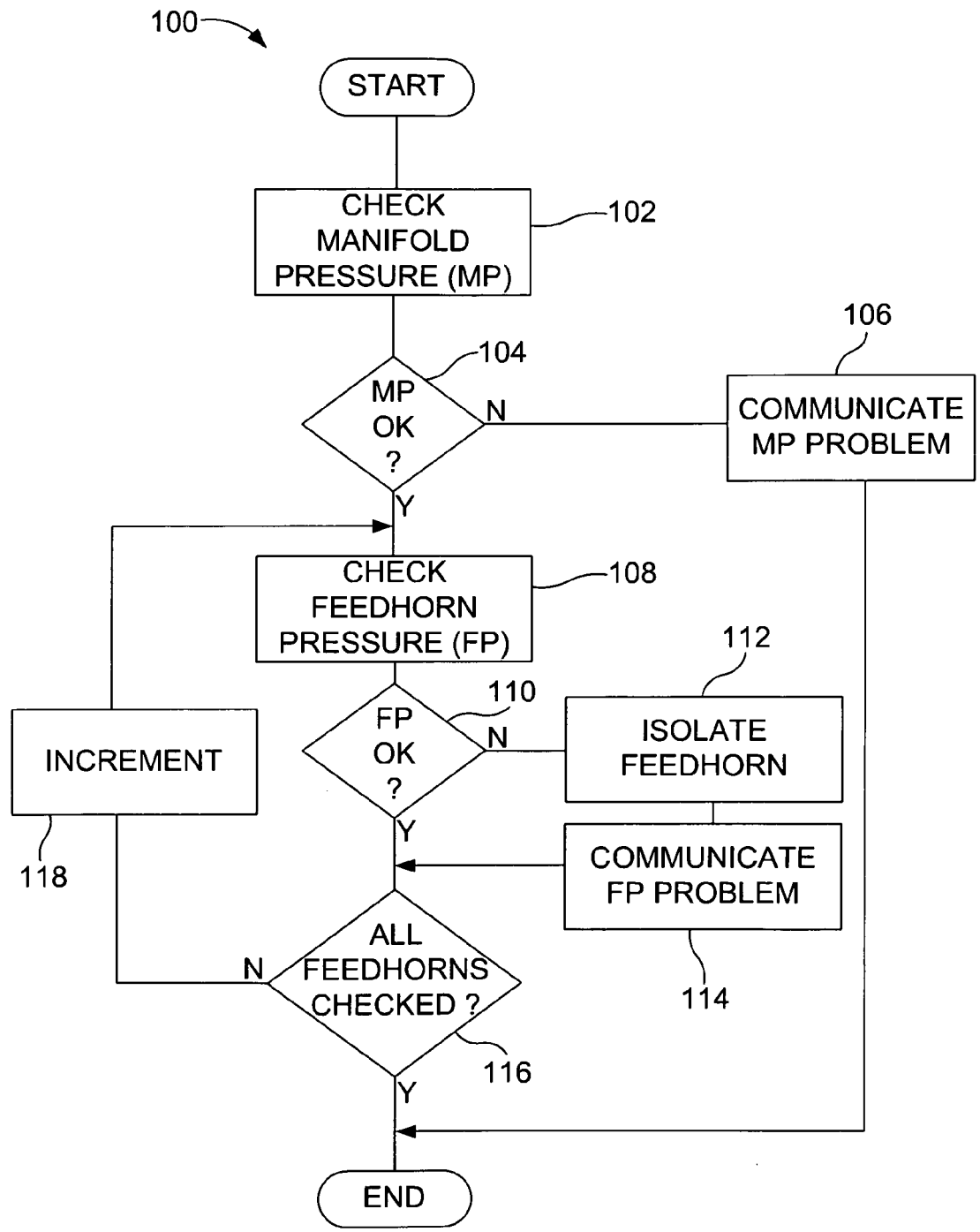
FIG. 4 is a flow chart illustrating an embodiment of the method utilized in the antenna system illustrated in FIG. 3.

Now, additionally referring to FIG. 4 there is illustrated a method 100 that utilizes the elements of FIG. 3 to check the pressure in antenna system 10. At step 102, gas pressure in manifold 62 is checked by isolating or turning valves 26, 28 and 30 to an off position. This allows method 100 to check the functionality of pressurized gas source 60 and its ability to supply gas to manifold 62. If the manifold pressure is not acceptable at step 104 then the manifold pressure problem is communicated at step 106 by way of communication device 36. The communication alerts the operator that the manifold pressure is below an acceptable level selected by pressure level setting device 40. If the manifold pressure is inadequate, not only is it communicated by way of communication device 36, but also indicator 50 is illuminated indicating that manifold pressure is too low, which may be caused by a failure of pressurized gas source 60.

If the pressure in manifold 62 is satisfactory then method 100 proceeds to step 108 in which one of the feed horns is connected by way of a respective valve to manifold 62. Once the feed horn that is selected, such as feed horn 16, then valve 26 is activated allowing pressure in manifold 62 to be supplied to feed line 16. Pressure sensor 38 again is used to detect the pressure in manifold 62 to see if the flow of air to feed horn 16 causes the pressure in manifold 62 to drop below the predetermined value. If the feed horn pressure is acceptable at step 110 then method 100 determines whether all the feed horns had been checked at step 116. If not all the feed horns had been checked then an internal counter is incremented at step 118 causing the next installed feed horn to be checked starting back at step 108.

If the feed horn pressure is not satisfactory as determined at step 110 then that particular feed horn is isolated at step 112 by turning the respective valve off and then communicating the feed horn pressure problem at step 114, by way of communication device 36 to an operator.

Method 100 may be initiated upon a periodic predetermined timing such as selected by time delay setting device 42. Additionally, method 100 may be carried out more than one time to verify the malfunction of feed horn pressure before communicating the problem by way of communication device 36.

Another method contemplated is to utilize valve 32 in which valves 26, 28, 30 are initially shut off thereby isolating feed horns 16, 22 and 24. Valve 32 may be positioned in an off position with pressure sensor 38 then monitoring the pressure in manifold 62. This allows the integrity in manifold 62 to be checked to determine if a drop in pressure within a specified time is less than a predetermined value. If the pressure in manifold 62 is satisfactory then a similar test is done by activating, one at a time, each of valves 26, 28 and 30 while keeping the rest of the valves in the isolated position. Pressure supplied by opening valve 32 and then valve 32 is closed and then bleed off pressure in manifold 62 is sensed by pressure sensor 38 to determine if the loss rate due to a particular feed horn satisfactory or whether there is an unacceptable gas leak.

Control circuitry may include semiconductor devices such as metal oxide field effect transistors that drive solenoids to allow direct control of the solenoids by way of controller 34. The control of indicators 44-50, while described in a negative sense in that they are illuminated when a problem occurs, can be utilized in an opposite sense where they are illuminated when the system is functioning normally. When a problem is detected indicators 44-50 may then blink or display a different color. When a leak is detected in antenna system 10 and the leak is due to a single feed horn that particular feed horn is isolated from system 10 with the rest of the feed horns receiving pressurized air in a normal fashion. The information transmitted by controller 34, by way of communication device 36, may include information that is transmitted in a preamble-data-postamble format. This may be communicated to a communication device that receives and then translates the information into a message sent to an operator. Additionally, communication device 36 may receive instructions from the operator to initiate controller 34 to retest or alternately to configure system 10 by way of the instructions received therefrom. For example, controller 34 may report a low pressure in the manifold system, and further communication from the operator may require controller 34 to keep one feed horn supplied with air and to isolate all others therefrom allowing a priority system to be established. The priority system would determine which of the feed horns is of a higher importance than the others.

The present invention advantageously allows configuring of the antenna system as well as monitoring of the pressurized system and isolating of the particular antenna(s) that may cause a leak in the air supplying system and thereby degrading the performance of potentially all of the antennas.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for determining the integrity of an antenna system, comprising:
    a controller;
    at least one valve operationally connected to said controller;
    a source of pressurized gas;
    at least one microwave antenna fluidly connected to said pressurized gas by way of said at least one valve; and
    a pressure sensor in communication with said controller, said pressure sensor sensing a pressure of said pressurized gas, said controller configured to check for a gas leak in said at least one microwave antenna by checking for a change in said pressure with said at least one valve being alternatively opened and closed, said at least one valve is fluidly positioned between said source of pressurized gas and said pressure sensor, said at least one valve includes a first valve and a second valve, said at least one microwave antenna includes a first microwave antenna and a second microwave antenna, said first valve controlling a fluid connectivity of said first microwave antenna with said source of pressurized gas, said second valve controlling a fluid connectivity of said second microwave antenna with said source of pressurized gas, said controller obtains a first pressure value from said pressure sensor after said controller has closed all of said valves, said controller opens said first valve and obtains a second pressure value from said pressure sensor, and said controller closes said first valve if said second pressure value is below a predetermined value.

2. The apparatus of claim 1, further comprising a communication device configured to send a signal if one of said first pressure value and said second pressure value is below said predetermined value.

3. An apparatus for determining the integrity of an antenna system, comprising:
    a controller;
    a plurality of valves operationally connected to said controller;
    a source of pressurized gas, said plurality of valves connected to said pressurized gas in a parallel relationship;
    a plurality of microwave antennas each fluidly connected to said source of pressurized gas by way of a corresponding one of said plurality of valves; and
    a pressure sensor in communication with said controller, said pressure sensor sensing a pressure of said pressurized gas, said controller configured to check for a gas leak in said plurality of microwave antennas by checking for a change in said pressure with said plurality of valves being alternatively opened and closed by said controller, said pressure sensor is fluidly positioned between said source of pressurized gas and said plurality of valves, said controller obtains a first pressure value from said pressure sensor after said controller has closed all of said plurality of valves, said controller opens one of said plurality of valves and obtains a second pressure value from said pressure sensor, and said controller closes said one of said plurality of valves if said second pressure value is below a predetermined value.

4. The apparatus of claim 3, further comprising a communication device configured to send a signal if one of said first pressure value and said second pressure value is below said predetermined value.

5. A method of determining the integrity of an antenna system, comprising the steps of:
    coupling a plurality of microwave antennas to a source of a pressurized gas, said plurality of microwave antennas including a first microwave antenna and a second microwave antenna, said first microwave antenna and said second microwave antenna being respectively connectable to said pressurized gas by way of a first valve and a second valve each under control of a controller;
    measuring a first pressure of said gas with a pressure sensor before said first microwave antenna is fluidly connected to said source of pressurized gas with said first valve being closed, said pressure sensor being in communication with said controller;
    measuring a second pressure of said gas with said pressure sensor after said first microwave antenna is fluidly connected to said source of pressurized gas by opening of said first valve;
    isolating said first microwave antenna by way of said controller closing said first valve if said first pressure and said second pressure differ by more than a predetermined value thereby indicating an integrity issue with said first microwave antenna; and
    communicating said integrity issue.

6. The method of claim 5, wherein said controller carries out said communicating step.

7. The method of claim 5, wherein said communicating step includes altering a visual indicator when an integrity issue arises.

8. The method of claim 5, wherein the step of measuring said first pressure of said gas is carried out when said second valve is closed.

9. The method of claim 8, further comprising the steps of:
measuring a third pressure of said gas with said pressure sensor after said first valve has been closed and said second valve is opened to said source of pressurized gas;
determining if said third pressure differs from said first pressure my more than an other predetermined value thereby indicating an other integrity issue.

10. The method of claim 9, further comprising the step of communicating said other integrity issue.

11. The method of claim 9, further comprising the step of isolating said first microwave antenna by way of said controller closing said second valve if said other integrity issue has been indicated.

* * * * *